United States Patent Office 2,929,470
Patented Mar. 22, 1960

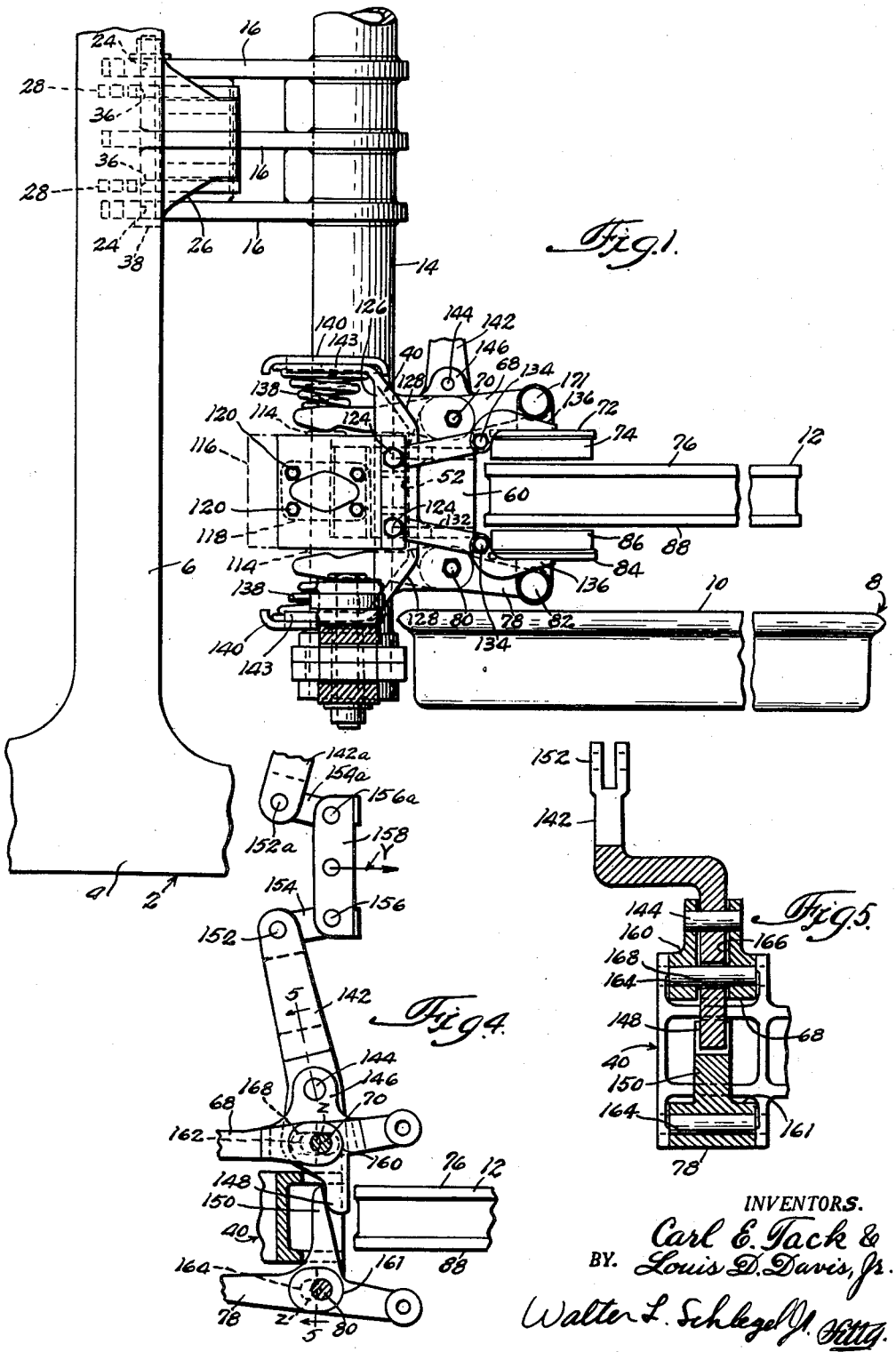
March 22, 1960 — C. E. TACK ET AL — 2,929,470
LEVER SYSTEM FOR ROTOR BRAKE
Filed March 25, 1955 — 2 Sheets-Sheet 1
INVENTORS.
Carl E. Tack &
BY Louis D. Davis, Jr.
Walter L. Schlegel Jr. ATTY.

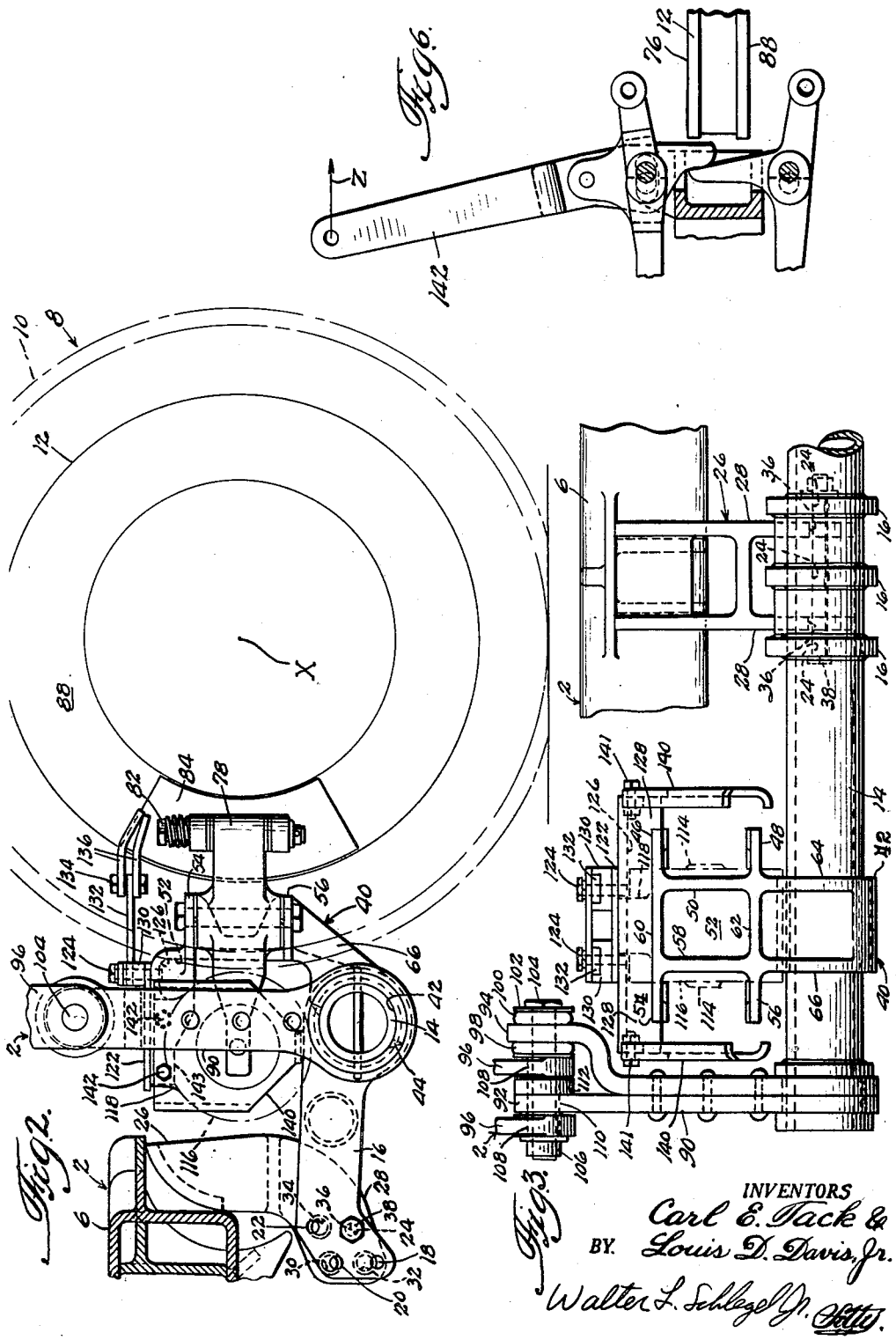

2,929,470

LEVER SYSTEM FOR ROTOR BRAKE

Carl E. Tack and Louis D. Davis, Jr., Chicago, Ill., assignors to American Steel Foundries, Chicago, Ill., a corporation of New Jersey Application March 25, 1955, Serial No. 496,698

6 Claims. (Cl. 188—59)

This invention relates to railway brakes and more particularly to improvements suitable for an off-wheel brake wherein a rotatable brake rotor or disk is mounted for rotation with a wheel of a wheel and axle assembly and is associated with brake means carried by a railway car truck structure supported by said assembly.

A primary object of the invention is to devise a compact and economical brake, the parts of which may be readily assembled and disassembled to facilitate installation and servicing thereof.

A more specific object of the invention is to provide a combination brake lever fulcrum and cylinder support which affords pivotal fulcrum for brake levers and a detachable mounting for their actuating piston and cylinder device as well as for guide links pivoted to said member and to the brake heads for maintaining their shoes in substantial parallelism with opposite sides of the brake rotor.

A further object of the invnetion is to provide a novel torque connection between the truck structure and the brake lever fulcrum and cylinder support member, said connection accommodating resiliently controlled lateral movement of the member relative to the frame and accommodating transmission of torque therebetween without deflection of or stress on the parts.

Another object of the invention is to devise a torque connection between the truck structure and the brake lever fulcrum and cylinder support member having novel means to adjustably position the brake shoes relative to the brake rotor.

Still another object of the invention is to adjust locking pressure of the shoes by variable drilling of the fulcrum holes in the brake levers.

Yet another object of the invention is to devise a hand brake particularly adapted to accommodate the variable drilling of the fulcrum holes in the brake levers. The novel hand brake may be operatively connected to the brake levers associated with one or both of the wheels of a wheel and axle assembly.

The foregoing and other objects and advantages of the invention will become apparent from a consideration of the following specification and the accompanying drawings, wherein:

Figure 1 is a fragmentary top plan view of a conventional railway passenger car truck having a preferred embodiment of the novel brake associated therewith, approximately one quarter of the truck being illustrated inasmuch as the arrangement is preferably symmetrical about the longitudinal and transverse center lines of the truck;

Figure 2 is a side elevational view of the structure shown in Figure 1;

Figure 3 is a front elevational view taken from the right as seen in Figure 2;

Figure 4 is a fragmentary plan view of the novel hand brake associated with the brake levers;

Figure 5 is a sectional view approximately on line 5—5 of Figure 4, and

Figure 6 is a fragmentary plan view similar to that of Figure 4 but illustrating a modification of the hand brake mechanism.

In each of said figures certain details are omitted where more clearly seen in other views.

Describing the invention in detail and referring first to Figures 1 to 3, it will be seen that the conventional railway car truck structure comprises a frame generally designated 2 having a side rail 4 at each side thereof and a transom 6 extending transversely of the truck and interconnecting the side rails 4 adjacent one end of the truck frame 2. The truck frame 2 is supported in the usual manner by springs (not shown) mounted on equalizers (not shown) each of which extends longitudinally of the truck and is supported at each end thereof by a wheel and axle assembly generally designated 8 comprising a wheel 10 and a brake disk or rotor 12. The wheel 10 is attached to an axle (not shown) in any conventional manner, and the rotor 12 is rotatable with the wheel by attachment thereto or to the axle.

The novel brake comprises a beam 14 preferably cylindrical in cross section and attached to three torque arms 16 having aligned holes 18, aligned holes 20, aligned holes 22 and aligned holes 24, as best seen in Figure 2, for a purpose hereinafter described. The torque arms 16 are associated with a bracket 26 attached in any desired manner to the transom 6 as by welding or by casting integral therewith. The bracket 26 comprises a pair of torque arms 28 having aligned holes 30, aligned holes 32, aligned holes 34 and aligned holes 36 which in the illustrated position of the torque arms 16 are registered with the holes 24 thereof and receive a bolt and nut assembly 38 passing through the holes 24 and 36 as shown in the drawings to afford a torque connection between the arms 16 of the beam 14 and the arms 28 of the bracket 26 and also to adjustably position associated brake shoes as hereinafter described.

A combination brake lever fulcrum and cylinder support member generally designated 40 is attached to the beam 14 by means of a parti-cylindrical jaw 42, preferably complementary in contour to the outer surface of the beam 14 and receiving the same so that the member 40 may be rotated about the longitudinal axis of the beam to any desired rotative position thereon and may be anchored thereto in any desired manner as by welding at 44 (Figure 2). The member 40 may be formed as a casting or as a weldment and comprises top and bottom inboard jaws 46 and 48 interconnected by a vertical rib 50 on a front wall 52 of the member 40, which also comprises top and bottom outboard jaws 54 and 56 interconnected by a rib 58 on the wall 52. The ribs 50 and 58 are interconnected by top and bottom ribs 60 and 62 and extend below the bottom rib 62 as at 64 and 66, respectively, to form gussets reinforcing the before-mentioned jaw 42.

A brake lever 68 is pivotally connected as by a pin 70 to the inboard jaws 46 and 48, and the lever 68 is pivotally connected as at 71 to a brake head 72 carrying any conventional brake shoe 74 for frictional engagement with an annular friction surface 76 at the inboard side of the rotor 12. Another brake lever 78 is pivoted as by a pin 80 to the outboard jaws 54 and 56 and is pivotally connected as at 82 to a brake head 84 carrying any conventional brake shoe 86 for frictional engagement with an annular brake surface 88 at the outboard side of the rotor 12.

It will be noted that the annular surfaces 76 and 88 of the rotor 12 are preferably approximately radial to the rotational axis thereof and, as best seen in Figure 2, are formed as annuli about said rotational axis designated X in said figure. Each brake shoe 74 and 86 and preferably the brake heads 72 and 84 are parti-annular in form, the radially inner and outer perimeters of the brake shoes preferably being formed on radii struck approximately from the axis X so that the brake shoes are generally complementary in form to the rotor surfaces 76 and 88 as best seen in Figure 2. In order to position the brake shoes properly with respect to the surfaces 76 and 88, as shown in the drawings, with the inner and outer perimeters of the shoes disposed as shown in Figure 2, the brake shoes may be rotated upwardly from the position shown in Figure 2 by registering holes 22 and 34 of the arms 16 and 28 and inserting the bolt and nut assembly 38 through the holes 22 and 34. In the event that downward rotation of the brake shoes is desired to insure concentricity thereof with respect to the rotor surfaces 76 and 88, the bolt and nut assembly 38 may be inserted through the holes 20 and 30 or through the holes 18 and 32.

This rotation of the brake shoes and their supporting levers 68 and 78 is accommodated by rotating the beam 14 within a complementary opening of a hanger 90 within which opening the beam 14 is rotatably journaled as best seen in Figures 2 and 3. The upper end of the hanger 90 is forked or bifurcated to provide spaced legs 92 and 94, the leg 92 being received between ears or lugs 96 of the frame 2, and the leg 94 overlapping the lugs 96 inboardly thereof as best seen in Figure 3. A resilient pad 98 is positioned between the leg 94 and the inboard ear 96 and a similar resilient pad 100 is received between the leg 94 and a washer 102 on a pin 104 extending through aligned openings of the pads 98 and 100 and through aligned openings of the ears 96 and the leg 92. The pads 98 and 100 are preferably precompressed by means of a cap 106 anchored in any desired manner as by cotter means (not shown) to the outboard end of the pin 104. The openings of the ears 96 are preferably bushed as at 108 to afford a snug fit on the pin 104 and the opening of the leg 92 is preferably similarly bushed as at 110. It will be noted, however, that the leg 92 and a pad 112 secured thereto in any desired manner as by welding are loosely fitted between the ears 96 to accommodate relative limited lateral or transverse movement between the truck frame 2 and the beam 14 in service, particularly when the brake shoes 74 and 86 are clamped against the friction surfaces 76 and 88 of the rotor under which conditions relative lateral movement between the wheel and axle assembly 8 and the truck frame 2 carry the beam 14 with the wheel and axle assembly as the bolt and nut assembly 38 slides within the openings 36 of the arms 28. This lateral movement is accommodated and resiliently cushioned by the resilient pads 98 and 100 acting against the inboard and outboard sides of the hanger leg 94.

The levers 68 and 78 are actuated by pistons fragmentarily indicated at 114, said pistons being received within a cylinder 116 having a nozzle 118 detachably anchored by cap screws 120 to a plate 122 which is detachably anchored by cap screws 124 to a gusset 126 interconnecting the front wall 52 of the member 40 to diagonal walls 128 thereof which converge toward their juncture with the front wall 52. The cap screws 124 also extend through bosses 130 on top of the plate to pivotally fulcrum links 132 thereto, said links being pivoted at 134 to top and bottom jaws 136 secured to the respective brake heads 72 and 84 for the purpose of maintaining the rotor engaging surfaces of the shoes 74 and 86 approximately parallel to the rotor surfaces 76 and 88 engaged thereby upon actuation of the levers 68 and 78.

Thus it will be understood that in servicing the novel brake arrangement the cylinder 116 with the piston 114 therein may be removed together wtih the plate 122 and the links 132 by loosening the cap screws 124 and disconnecting the bolt and nut assemblies 134.

The novel brake is actuated by admitting a pressure fluid such as air or liquid to a port (not shown) in the nozzle 118 of the cylinder thereby directing said fluid between the pistons 114 to urge the engaged ends of the levers 68 and 78 outwardly from each other thereby clamping the shoes 74 and 86 against the rotor surfaces 76 and 88 respectively. Upon release of pressure against the pistons, release springs 138 urge the lever 68 and 78 and the pistons 114 to the release position shown in the drawings, said springs 138 being compressible between the respective levers and spring plates 140 detachably anchored as at 141 to wing 143 integrally formed with and extending rearwardly from the walls 128 of the member 40.

Referring now to Figures 4 and 5, it will be seen that a hand brake lever 142 is pivotally fulcrumed as at 144 to an ear 146 of the lever 68 and comprises a nose 148 engageable with an arm or lug 150 of the lever 78. The end of the hand brake lever 142 remote from its nose 148 is pivotally fulcrumed as at 152 to a link 154 which is pivoted as at 156 to an equalizer 158 adapted for actuation by any conventional linkage in the direction of the arrow Y of Figure 4. The opposite end of the equalizer 158 is similarly pivoted at 156a to a link 154a which is pivoted at 152a to a hand brake lever 142a associated with the corresponding brake lever 68 (not shown) of the brake for the rotor 12 at the opposite end of wheel and axle assembly 8. The hand brake lever 142 is actuated by urging the equalizer 158 in the direction of the arrow Y in Figure 4 to rotate the hand brake lever 142 in a clockwise direction about the pivot point 144 until the brake shoe 86 actuated by the lever 78 is clamped against the outboard friction surface 88 of the rotor 12, whereupon the nose 148 pivotally fulcrums against the arm 150 of the lever 78 to rotate the brake lever 68, thereby clamping its brake shoes 74 against the inboard surface 76 of the rotor 12.

As shown in Figure 4, the pivot pins 70 and 80 extend through complementary openings of the levers 68 and 78 respectively, the opening of the lever 68 being formed through top and bottom bosses 160 which are elongated lengthwise of the lever 68, and the opening in the lever 78 for the pin 80 extends through similar bosses 161 of the lever 78. In the event that lower braking pressures are desired, the holes for the pins 70 and 80 may be drilled as indicated at phantom lines at 162 and 164, respectively, in Figure 4. The hand brake lever 142 which extends through a substantially horizontal transverse slot 166 of the brake lever 68 is provided with an opening or slot 168 receiving the pin 70 and elongated to accommodate movement of the hand brake lever 142 relative to the pin 70 during actuation of the hand brake lever with the pin 70 at the position indicated by solid lines in Figure 4 or in the position indicated at 162 by phantom lines in Figure 4. The center of the opening for each pin 70 and 80 is preferably at one side of the short axis 2 of the related bosses 160 and 161.

Figure 6 illustrates a modification of the hand brake arrangement which is identical with that shown in Figure 4 except that the lever 142 is elongated and the equalizer 158 is eliminated, the lever 142 being actuated directly by a hand brake linkage in the direction of the arrow Z. The purpose of the modification shown in Figure 6 is to afford sufficient capacity for a hand brake arrangement in which the hand brake is applied to only one rotor 12 of the wheel and axle assembly as distinguished from the arrangement of Figure 4 wherein the hand brake mechanism is associated with both rotors 12 of the wheel and axle assembly as above discussed in connection with the function of the equalizer 158.

We claim:

1. In a brake arrangement for a railway car truck having a truck structure spring-supported by a wheel and axle assembly and having axially opposed brake surfaces rotatable with said wheel; the combination of a brake support carried by said structure, brake levers, friction means actuated by said levers for engagement with said surfaces, a pair of pins fulcruming respective levers to said support, one of said levers having an integral arm projecting toward the other lever, and an actuating lever connected to said support by the same pin that fulcrums said other lever and being directly engageable with said arm to actuate said one lever, said other lever and said actuating lever being connected to each other at a location disposed on the side of said same pin remote from said one lever for actuation of said other lever by said actuating lever.

2. In a brake arrangement for a railway car truck having a truck structure spring-supported by a wheel and axle assembly having opposed brake surfaces rotatable with said wheel; the combination of brake support means carried by said truck, brake levers, friction means operatively connected to said brake levers for actuation thereby to engage said brake surfaces, pins fulcruming respective levers to said support, an arm on one of the brake levers projecting toward the other brake lever, said other brake lever presenting therein a transverse slot intermediate its ends, and an actuating lever disposed to extend through said slot fulcrumed to said other brake lever and directly engageable with said arm to actuate said one brake lever, said actuating lever having an opening receiving the related pin, said opening being elongated lengthwise of said other brake lever to accommodate variable positioning of said pin.

3. In a brake arrangement for a railway vehicle supported by a wheel and axle assembly, the combination of: a pair of friction means engageable with the assembly; a brake support carried by the vehicle; a pair of dead brake levers connected to the respective friction means; a pair of pins fulcruming the respective levers to the support; and an actuating lever connected to the support by the same pin that fulcrums one of said brake levers, said actuating lever being engageable with the other lever at a location between said pins for the actuation of said other lever by the actuating lever and being connected to said one lever at a location on the side of said same pin remote from the other pin for the actuation of said one lever by the actuating lever.

4. In a brake arrangement for a railway vehicle supported by a wheel and axle assembly, the combination of: a pair of friction means engageable with the assembly; a brake support carried by the vehicle; a pair of dead brake levers connected to the respective friction means; a pair of pins fulcruming the respective levers to the support; and an actuating lever having located intermediate its ends a slot through which is received the fulcrum pin of one of said brake levers, said actuating lever having operative connections with the respective brake levers on opposite sides of said slot.

5. A brake arrangement according to claim 3 wherein the connection between the actuating lever and the other brake lever is located between said pins.

6. A brake arrangement according to claim 3, wherein the engagement between the actuating lever and the other brake lever is effected by a nose on the actuating lever, and an arm on the other brake lever projecting toward the one brake lever and abutably engageable with said nose.

References Cited in the file of this patent

UNITED STATES PATENTS

| | | |
|---|---|---|
| 2,236,898 | Eksergian | Apr. 1, 1941 |
| 2,272,647 | Simanek | Feb. 10, 1942 |
| 2,355,123 | Tack et al. | Aug. 8, 1944 |
| 2,382,870 | Gaenssle et al. | Aug. 14, 1945 |
| 2,383,376 | Gaenssle | Aug. 21, 1945 |
| 2,436,136 | Baselt | Feb. 17, 1948 |
| 2,438,482 | Tack | Mar. 23, 1948 |
| 2,467,356 | Eksergian | Apr. 12, 1949 |
| 2,498,625 | Tack | Feb. 21, 1950 |
| 2,622,704 | Gaenssle et al. | Dec. 23, 1952 |
| 2,627,322 | Tack | Feb. 3, 1953 |
| 2,678,113 | Angle | May 11, 1954 |
| 2,713,400 | Coskum | July 19, 1955 |
| 2,780,317 | Bachman et al. | Feb. 5, 1957 |
| 2,815,095 | Polanin | Dec. 3, 1957 |
| 2,815,102 | Tack | Dec. 3, 1957 |
| 2,816,629 | Bachman et al. | Dec. 17, 1957 |
| 2,857,990 | Andrzejewski | Oct. 28, 1958 |